US006808082B2

(12) United States Patent
Ohkubo

(10) Patent No.: US 6,808,082 B2
(45) Date of Patent: Oct. 26, 2004

(54) VENDING MACHINE AND OPERATION CONTROL METHOD THEREOF

(75) Inventor: Masaru Ohkubo, Isesaki (JP)

(73) Assignee: Sanden Corporation, Gunma (JP)

( * ) Notice: Subject to any disclaimer, the term of this patent is extended or adjusted under 35 U.S.C. 154(b) by 199 days.

(21) Appl. No.: 10/274,948

(22) Filed: Oct. 22, 2002

(65) Prior Publication Data

US 2003/0075552 A1 Apr. 24, 2003

(30) Foreign Application Priority Data

Oct. 22, 2001 (JP) ....................................... 2001-323808

(51) Int. Cl.[7] ................................................ B65G 56/00

(52) U.S. Cl. ........................ 221/123; 221/129; 221/133

(58) Field of Search ................................ 221/123, 129, 221/133, 236

(56) References Cited

U.S. PATENT DOCUMENTS 4,108,333 A * 8/1978 Falk et al. .................... 221/13
4,252,250 A * 2/1981 Toth ............................ 221/13
4,986,441 A * 1/1991 Kanbe et al. ............... 221/130
6,199,720 B1 * 3/2001 Rudick et al. ................. 221/6
6,357,621 B1 * 3/2002 Guindulain Vidondo ..... 221/85
6,499,627 B2 * 12/2002 Arai ........................... 221/130

FOREIGN PATENT DOCUMENTS

JP 09-259342 10/1997
JP 2000-082171 3/2000

* cited by examiner

*Primary Examiner*—Christopher E. Ellis
*Assistant Examiner*—Rashmi Sharma
(74) *Attorney, Agent, or Firm*—Banner & Witcoff, Ltd.

(57) ABSTRACT

A vending machine has capabilities for moving an elevator and a product bucket so the product bucket faces a given product column containing products, then moving forward a conveyer belt of the given product column to carry a foremost product of the products placed in line on the conveyer belt into the product bucket. This vending machine has a product position adjustment apparatus for moving the conveyer belt of the given product column forward or backward to adjust a position of the front edge of a next foremost product on the conveyer belt to a given position after the foremost product in the given product column is carried into the product bucket.

12 Claims, 12 Drawing Sheets

VENDING MACHINE AND OPERATION CONTROL METHOD THEREOF

This application is based upon and claims the benefit of priority from Japanese Patent Application No. 2001-323808, filed Oct. 22, 2001, the entire contents of this application are incorporated herein by reference.

BACKGROUND OF THE INVENTION

1. Field of the Invention

The present invention relates to a vending machine for vending a selected product in response to a deposition of coins or bills and a depression of a product selecting button. In particular, the present invention relates to a vending machine that allows products contained in a plurality of product columns and a vending operation in which a selected product in a given product column is guided to a product vending outlet to be seen from outside through a transparent front panel and to an method of controlling operations of the vending machine.

2. Description of the Related Art

A vending machine of this type comprises a plurality of shelves vertically spaced apart in a storage room, a plurality of product columns provided on each of the shelves side by side, an elevator capable of moving up and down, and a product bucket capable of moving sideways on the elevator, as described in Japanese Patent publication No. 2000-82171 and H9-259342.

Because products contained in each product column can be seen from outside through a transparent panel of a main door, a purchaser can see the products contained in each product column and select a desired one. Upon depositing coins or bills and depression of a product selecting button by the purchaser, the elevator and the product bucket move so that the product bucket faces the prescribed product column containing the product to be sold in a position where the product can be carried out of the column. Then, the product is carried out of the given product column into the product bucket and the product placed in the bucket is guided to a product vending outlet.

There is a problem with the vending machine in which each product column has a conveyer belt on which the products can be placed in a line and the conveyer belt of the given product column is moved forward to carry the foremost product on the conveyer belt into the product bucket. That is, after the foremost product on the conveyer belt is carried out, the front edge of the next foremost product on that conveyer belt is not positioned in line with the other products due to a difference in size between them.

Especially in the see-through type vending machine that makes products contained in each product column visible to the purchaser through the transparent front panel for selection of the product to buy, variations in the positions of the front edges of the foremost products can significantly degrade the appearance of the products and diminish the purchasers' appetite for buying.

SUMMARY OF THE INVENTION

The present invention relevant to a vending machine comprises: a plurality of product columns each having a conveyer belt capable of moving forward and backward; a belt driving apparatus for moving the conveyer belt forward and backward; an elevator provided in front of the product columns and being capable of moving up and down; an elevator driving apparatus for moving the elevator up and down; a product bucket provided in the elevator and being capable of moving sideways; a bucket driving apparatus for moving the product bucket sideways; product carrying-out means for moving the elevator and the product bucket so the product bucket faces a given product column containing products and moving forward the conveyer belt of the given product column to carry a foremost product of the products placed in line on the conveyer belt into the product bucket; and product position adjustment means for moving the conveyer belt of the given product column forward or backward to adjust a position of the front edge of a next foremost product on the conveyer belt to a given position after the foremost product in the given product column is carried into the product bucket.

Also, the present invention relevant to an operation method of a vending machine; which has a plurality of product columns each having a conveyer belt capable of moving forward and backward, a belt driving apparatus for moving the conveyer belt forward and backward, an elevator provided in front of the product columns and being capable of moving up and down, an elevator driving apparatus for moving the elevator up and down, a product bucket provided in the elevator and being capable of moving sideways, and a bucket driving apparatus for moving the product bucket sideways; comprises the steps of: moving the elevator and the product bucket so the product bucket faces a given product column containing products; moving forward the conveyer belt of the given product column to carry a foremost product of the products placed in line on the conveyer belt into the product bucket; and moving the conveyer belt of the given product column forward or backward to adjust a position of the front edge of a next foremost product on the conveyer belt to a given position.

According to said vending machine and said operation method, even if the front edges of the products on the timing belts does not come to the given position due to variations in size of the products while the products are being carried out of the product columns into the product bucket, the positions of the front edges of the products can be adjusted to the given position by moving the timing belt forward or backward after the products were carried out of the product columns into the product buckets.

Therefore, even if the products of different sizes are contained in the product columns, forward or backward variations in positions of the front edges of the next foremost products on the timing belts of the product columns can be prevented. In addition, since the front edges of the next foremost products in the product columns can be aligned with the given position regardless of their size, the appearance of the products contained in the product columns for a purchaser to directly see them through the transparent front panel for choosing one to buy can be enhanced to inspire the purchasers' appetite for buying the products.

The above and other objects, features, and advantages of the present invention will be apparent from the following description and the accompanying drawings.

DESCRIPTION OF THE PREFERRED EMBODIMENTS

Figure 1:
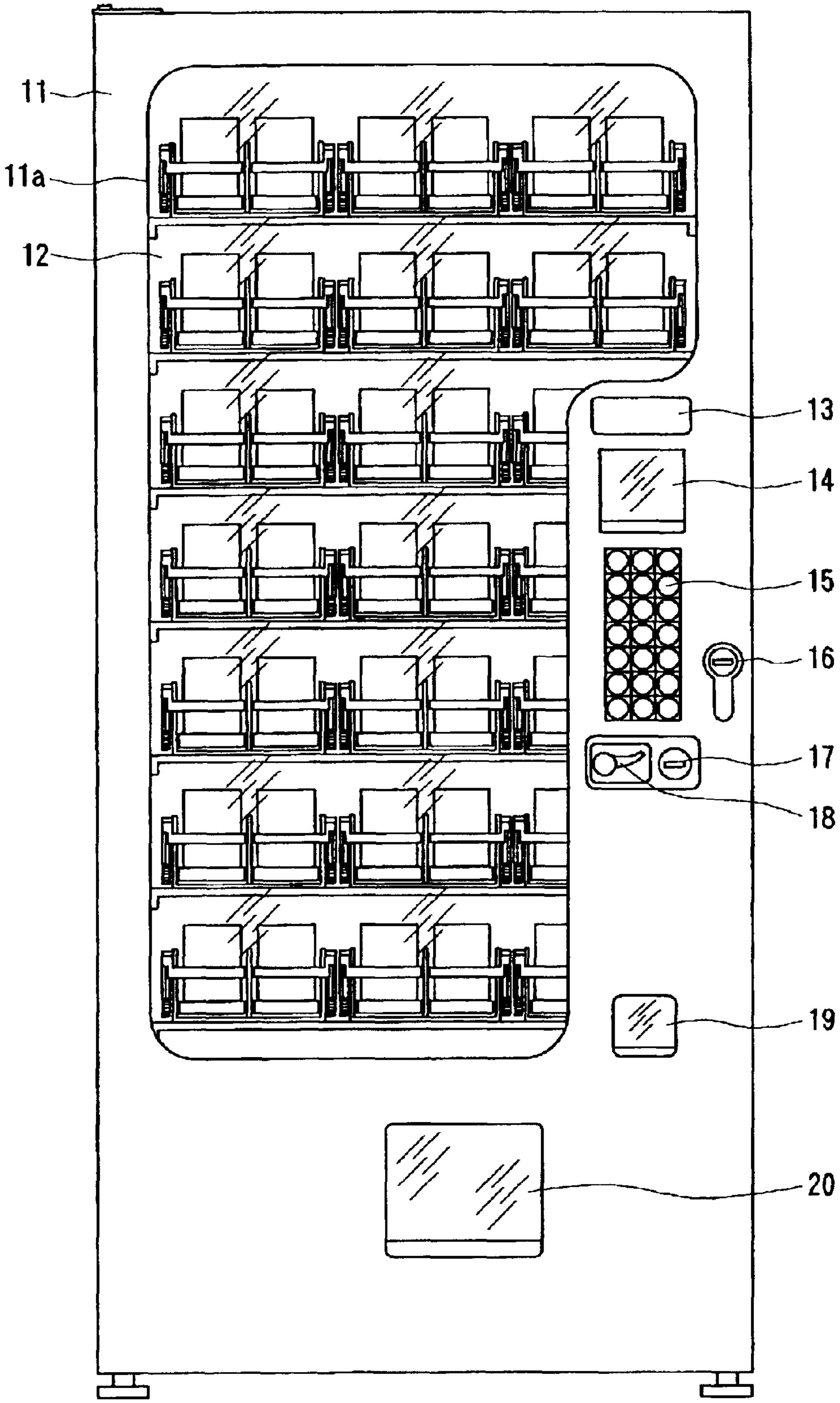
FIG. 1 is a front elevation view of a vending machine to which the present invention is applied.
Figure 2:
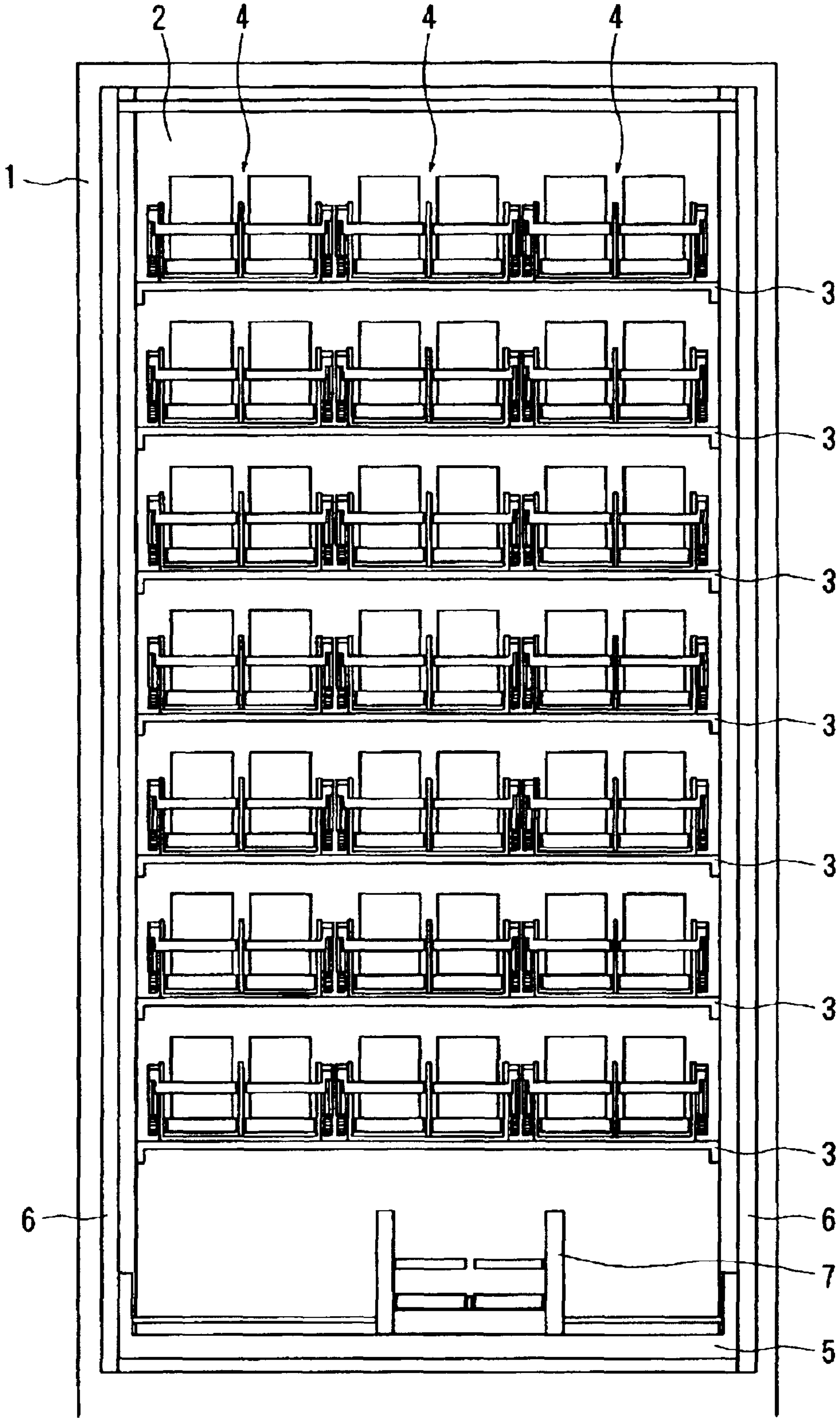
FIG. 2 is a front elevation view of a machine body for showing internal arrangements of the vending machine shown in FIG. 1.

FIG. 1 is a front elevation view of a vending machine to which the present invention is applied. FIG. 2 is a front elevation view of a machine body for showing internal arrangements of the vending machine shown in FIG. 1.

As shown in FIG. 2, a machine body 1 comprises a front-open, thermally insulated storage room 2 and a machinery room (not shown) beneath the storage room 2. The storage room 2 has seven shelves 3 spaced at intervals in an up and down direction. Each of the shelves 3 has three product columns 4 for containing products G side by side. An elevator 5 having approximately the same width as that of the shelves 3 is provided at the front side of the product columns 4. An elevator driving apparatus 6 for raising and lowering the elevator 5 is provided on both of the interior sides of the storage room 2 that face the elevator 5. One product bucket 7 is provided on the elevator 5 and a bucket driving apparatus 8 (see FIG. 4B) is provided in the elevator 5 for moving the bucket 7 sideways on the elevator 5.

As shown in FIG. 1, a main door 11 is openably provided on the front of the machine body 1. On the front of the main door 11 there is provided an opening **11*a*, over which there is a transparent panel 12 made of a transparent material such as glass or a transparent resin. Also on the front of the main door 11 there are provided a display 13, a bill slot 14, a product selecting button 15, a lock 16 for the main door 11, a coin slot 17, a return lever 18, a coin return opening 19, and a product vending outlet 20**.

The front opening of the storage room 2 is openably covered by an internal door having a transparent panel made of a transparent material such as glass or a transparent resin, while this is not shown in the figure. An evaporator, a heater and a fan are provided within the storage room 2 for selectively cooling and heating products. A compressor, a condenser, and other components constituting a refrigerating unit along with an evaporator are provided within the machinery room.

In the vending machine shown in FIGS. 1 and 2, a product vending arrangement for guiding a product G in a given product column 4 to the product outlet 20 consists of the above-mentioned shelves 3, product columns 4, elevator 5, elevator driving apparatus 6, product bucket 7, and bucket driving apparatus 8.

Figure 3:
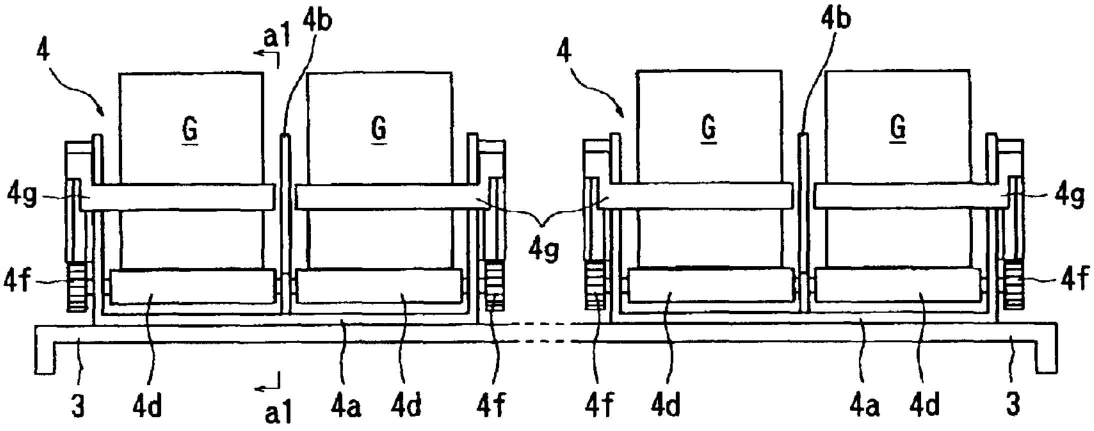
FIG. 3A is an enlarged front elevation view of product columns shown in FIG. 2.
FIG. 3B is a cross-sectional view taken on a line a1—a1 in FIG. 3A.
Figure 3:
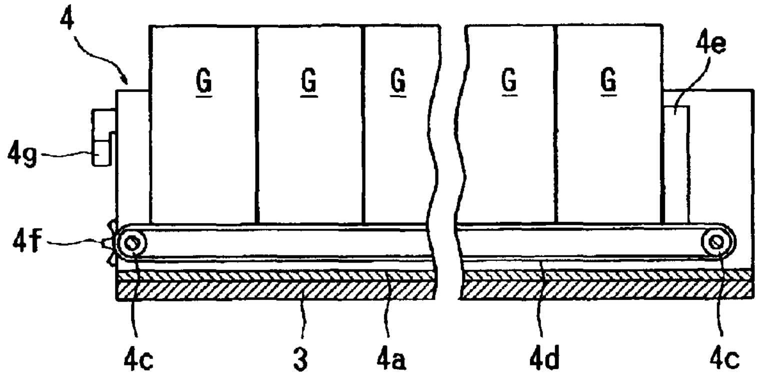
Figure 4:
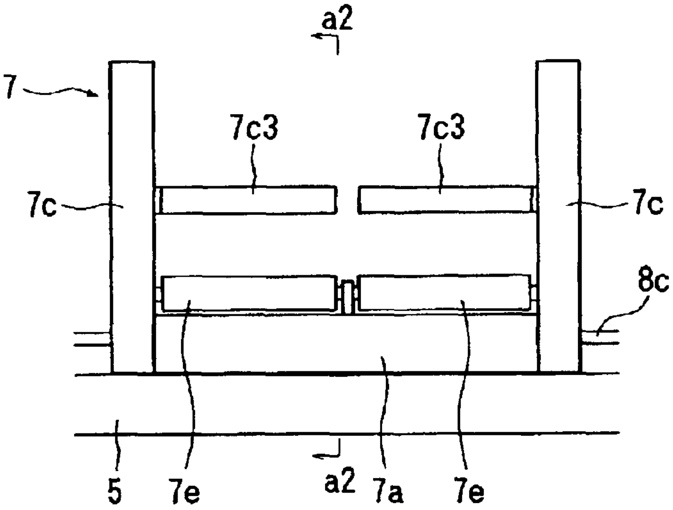
FIG. 4A is an enlarged front elevation view of a product bucket shown in FIG. 2.
FIG. 4B is a cross-sectional view taken on a line a2—a2 in FIG. 4A.
FIG. 4C is a diagram for showing a state where a press-down lever, a connector arm, and a product guard of the product bucket shown in FIG. 2, are moved from a stand-by position to a product carrying-out position.
Figure 4:
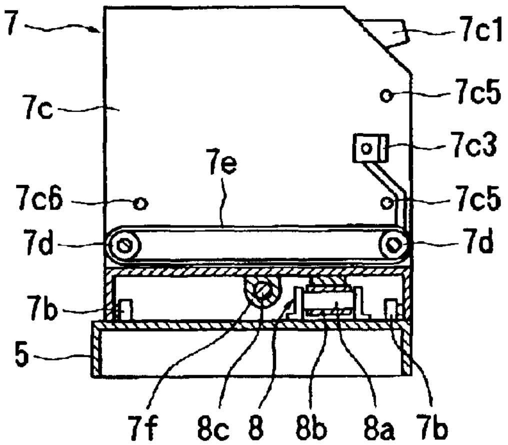
Figure 4:
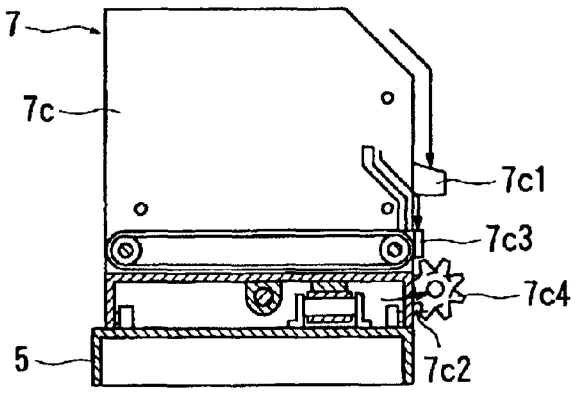

FIGS. 3 and 4 show in detail portions of the product carrying apparatus described above. FIG. 3A is an enlarged front elevation view of a product column shown in FIG. 2, FIG. 3B is a cross-sectional view taken on line a1—a1 in FIG. 3A, FIG. 4A is an enlarged front elevation view of the product bucket shown in FIG. 2, FIG. 4B is a cross-sectional view taken on line a2—a2 in FIG. 4A, and FIG. 4C is a diagram for showing a state where a press-down lever, a connecting arm, and a product guard of the product bucket shown in FIG. 2, at a product carrying-out position are moved from a stand-by position.

As shown in FIGS. 3A and 3B, each product column 4 comprises a U-shaped column body **4*a* mounted on the shelf 3 with a sliding rail and other fittings, a partition plate 4*b* removably provided in the center of the length of the column body 4*a*, a two pairs of front and rear timing pulleys 4*c* provided in the interior of the column body 4*a*, an endless timing belt 4*d* wrapped around each pair of front and rear timing pulleys 4*c*, a product stopper plate 4*e* provided on each of timing belts 4*d*, a driven gear 4*f* provided at the outer end of the shaft of each front timing pulley 4*c*, and a product guard 4*g* provided above the front of each timing belt 4*d*** with upward force being applied to by a coiled spring.

The products G such as boxed drinks, canned drinks, other drinks and products except drinks are placed in a line on and along the length of each of the two timing belts **4*d* of each product column 4. Each product column 4 has no power source for driving the two timing belt 4*d* individually. Each of the timing belts 4*d* operates to carry the products G toward the front when a rotatory force is transmitted to the driven gear 4*f* from the product bucket 7, which will be described later. A product larger than those shown can be places on the two timing belts 4***d* of each product column 4 by removing the partition plate 4*b*. Typically, individual product columns 4 contain different product items. However, more than two product columns 4 may contain the same product items.

As shown in FIGS. 4A through 4C, the product bucket 7 comprises a bucket body 7*a*, a plurality of rollers 7*b* provided under the bucket body 7*a*, two driving units 7*c* provided on either side of the bucket body 7*a*, a pair of front and rear timing pulleys 7*d* provided on the bucket body 7*a*, two endless timing belts 7*e* provided side by side and wrapped around the pair of front and rear timing pulleys 7*d*. A guide bushing 7*f* is provided on the undersurface of the bucket body 7*a*, in which a guide rod 8*c* (described later) is inserted.

Each driving unit 7*c* has a first motor M1 (see FIG. 5) and a gear apparatus (not shown) in it for operating the press-down lever 7*c*1, the connecting arm 7*c*2, and the product guard 7*c*3 simultaneously. Each driving unit 7*c* also has a second motor M2 (see FIG. 5) and a gear apparatus (not shown) in it for rotating a driving gear 7*c*4 provided on the connecting arm 7*c*2. A third motor (see FIG. 5) and a gear apparatus (not shown) are provided in one of the driving units 7*c* for rotating one of the front and rear timing pulleys 7*d* to cause both of the timing belts 7*e* to feed the product G toward the front. In addition, one of a light projector and a light receiver composing an inlet sensor 7*c*5 for detecting the position of the product G is provided in the rear, inner surface of one of the driving unit 7*c* and the other one of the light projector and light receiver of the inlet sensor 7*c*5 is provided in the other driving unit 7*c*. Furthermore, one of a light projector and a light receiver composing an outlet sensor 7*c*6 for detecting the position of the product G is provided in the front, inner surface of one of the driving unit 7*c* and the other of the light projector and light receiver of the outlet sensor 7*c*6 is provided in the other driving unit 7*c*.

As shown in FIG. 4B, the bucket driving apparatus 8 comprises, a pair of left and right timing pulleys 8*a* provided on the elevator 5, an endless timing belt 8*b* wrapped around the pair of left and right timing pulleys 8*a*, a guide rod 8*c* provided from side to side over the elevator 5, a motor (not shown) for transmitting a rotatory force to one of the timing pulleys 8*a*, and a rotary encoder (not shown) for detecting the rotation angle of the motor. A pulse signal output from the rotary encoder of the bucket driving apparatus 8 is used as a reference signal for generating positioning data of each shelf 3. The bucket body 7*a* of the product bucket 7 as described above is fixed on a section of the timing belt 8*b*, the guide bushing 7*f* on the bottom surface of the bucket body 7*a* is engaged with the guide rod 8*c*, and the rollers 7*b* is in contact with the elevator 5. Alternatively, the bucket driving apparatus 8 may be a apparatus in which a motor-driven ball screw is provided on the elevator 5 and a nut engaged with the ball screw is connected to the product bucket 7.

The elevator driving apparatus 6 comprises a two open-ended chains (not shown) one end of which is connected to the left or right end of the elevator 5, two gears (not shown) which are provided at the top of the apparatus and around which the chains are wrapped, a balancing weight (not shown) fixed at the other end of each chain, a rod (not shown) for tying the two gears to each other, a motor (not shown) for transmitting a rotatory force to the rod, and a rotary encoder (not shown) for detecting the rotation angle of the motor. A pulse signal output from the rotary encoder of the elevator driving apparatus 6 is used as a reference signal for generating positioning data of each product column 4. Alternatively, as the elevator driving apparatus 6, it is possible to use a apparatus in which two endless chains are wrapped around gears provided at the top and bottom and the balancing weight mentioned above is eliminated.

Figure 5:
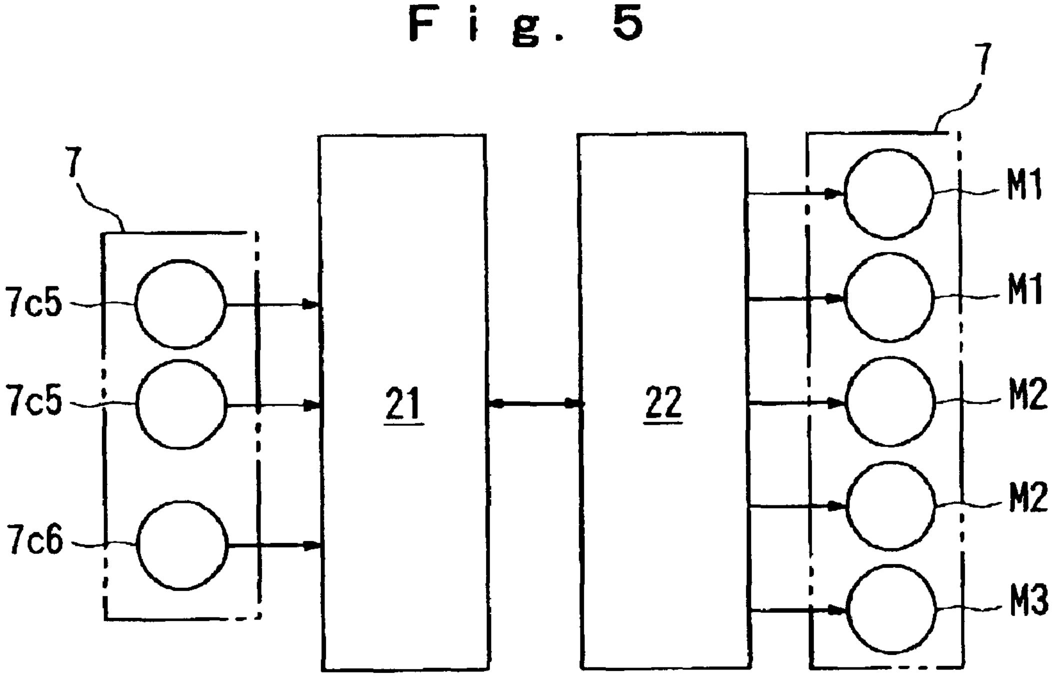
FIG. 5 is a schematic diagram of a control circuit for controlling motors of the product bucket.

FIG. 5 shows a schematic diagram of a control circuit for controlling the motors of the product bucket 7. In the FIG. 5, reference number 21 denotes a microcomputer-based controller, reference number 22 denotes a driver for supplying predetermined electric power to the two first motors M1, two second motors M2, and one third motors M3 provided in the product bucket 7 according to a control signal from the controller 21. Signals from the inlet sensor 7*c*5 and outlet sensor 7*c*6 provided in the product bucket 7 are input into the controller 21. A product carrying method and a position adjustment method performed by the control circuit shown in FIG. 5 will be apparent from the following description.

A product vending operation performed in the vending machine described above will be described below.

Figure 7:
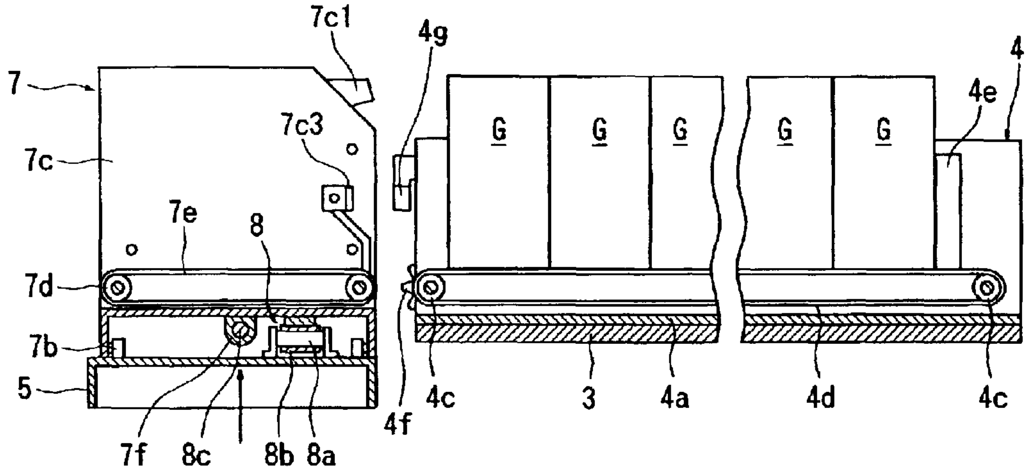
FIG. 7 is a diagram for explaining a product vending operation.

In product vending operation, a target position is determined at which positions the given product column 4 containing the product G (corresponding to the pressed product selecting button 15) and the product bucket 7 properly face each other, from positioning data of the shelves 3 and the product columns 4 which are stored in memory of the controller 21, based on a product vending command generated when a purchaser deposits a coin or bill and presses the product selecting button 15. Then, the elevator 5 and product bucket 7 are made to move from its stand-by position shown in FIG. 2 toward the determined target position (see FIG. 7).

Figure 8:
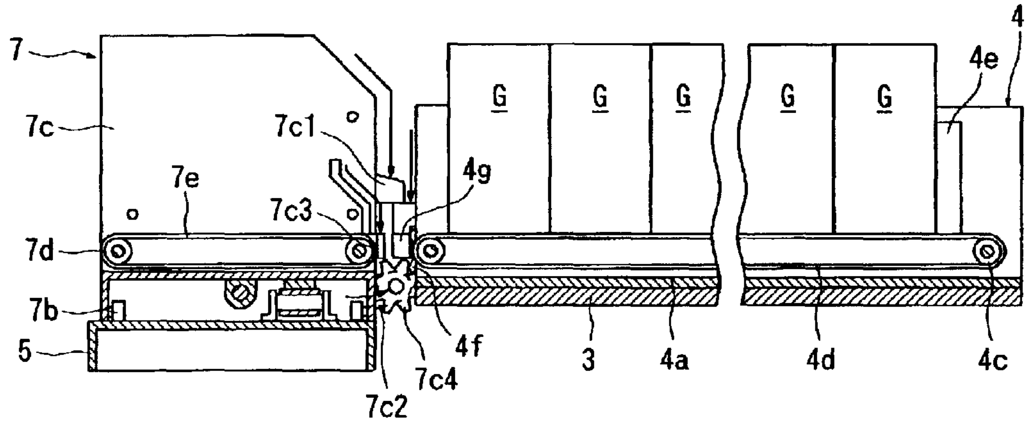
FIG. 8 is a diagram for explaining the product vending operation.

Then, the first motor M1 in one of the driving units 7*c* of the product bucket 7 is activated to move the press-down lever 7*c*1, connecting arm 7*c*2, and product guard 7*c*3 from its stand-by position to the product carrying-out position (see FIG. 8). As a result, the press-down lever 7*c*1 is lowered from its stand-by position to press down one of the product guards 4*g* of the product column 4 against the spring biasing force and the product guard 4*g* is inserted into a gap between the timing belt 4*d* of the product column 4 and the timing belt 7*e* of the product bucket 7. The connecting arm 7*c*2 is projected from its stand-by position toward the rear and the driving gear 7*c*4 engages the driven gear 4*f* of the product column 4. The product guard 7*c*3 is lowered from the stand-by position and inserted in the gap between the timing belt 4*d* of the product column 4 and the timing belt 7*e* of the product bucket 7.

Figure 6:
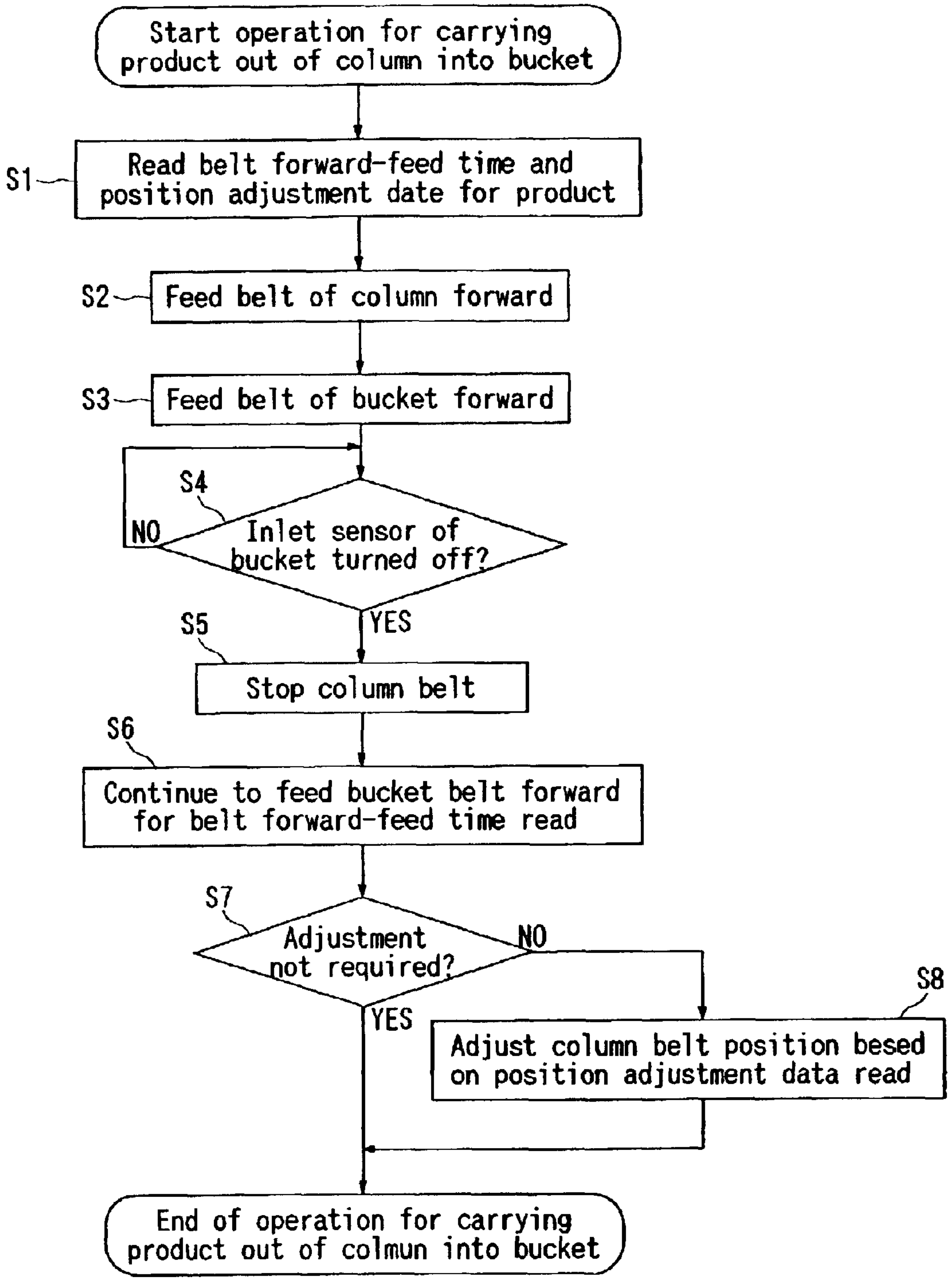
FIG. 6 is a program flow chart involved in carrying a product from a product column to the product bucket.

After the elevator 5 and the product bucket 7 reach the target position and the preparatory operation for carrying out the product is completed, the product is carried out from the given product column 4 to the product bucket 7 according to a program flow chart shown in FIG. 6.

First, forward feed time Tf of the timing belt 7*e* of the product bucket 7, which corresponds to the selected product G and position adjustment data Da corresponding to the selected product G are read from the memory of the controller 21 (step S1 in FIG. 6).

The forward feed time Tf and position adjustment data Da are predetermined based on the size of each product G contained in each product column 4 and stored in the memory of the controller 21. The forward feed time Tf is an amount of time period from the time when the product G in the given product column 4 is placed on the timing belt 7*e* of the product bucket 7 to turn off the inlet sensor 7*c*5, during which time period the timing belt 7*e* of the product bucket 7 is operating. The position adjustment data Da is used for adjusting, after the foremost product G in the product column 4 being carried out to the product bucket 7 forward or backward, the position of the front edge of the next foremost product G in the product column 4. The data Da includes data on the moving direction of the timing belt 4*d* of the product column 4 and moving time.

Figure 9:
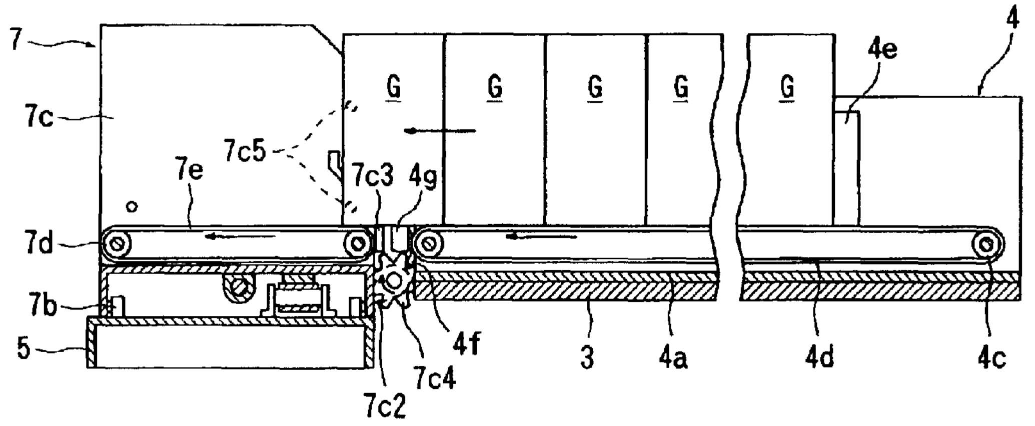
FIG. 9 is a diagram for explaining the product vending operation.

Next, as shown in FIG. 9, the second motor M2 in one of the driving units 7*c* of the product bucket 7 is activated to rotate the driving gear 7*c*4. The turning force is transmitted to the driven gear 4*f* in the product column 4 to rotate one of the timing belts 4*d* counterclockwise in the drawing to carry the products G toward the front (step S2 in FIG. 6). At the same time, the third motor M3 in the product bucket 7 is activated to rotate both timing belts 7*e* counterclockwise in the drawing to carry the products toward the front (step S3 in FIG. 6). As a result, the foremost product G on the timing belt 4*d* of the product column 4 moves toward the front and gets into the timing belt 7*e* of the product bucket 7.

Then, as shown in FIG. 9, it is decided whether the inlet sensor 7*c*5 of the product bucket 7 is turned off by the foremost product G by the foremost product G on the timing belt 4*d* of the product column 4 gets into the timing belt 7*e* of the product packet 7 (step S4 in FIG. 6).

If the inlet sensor 7*c*5 of the product bucket 7 is turned off at step S4, the timing belt 4*d* of the product column 4 is stopped, while the product G continues to be carried toward the front by the timing belt 7*e* of the product bucket 7 rotated counterclockwise in the drawing for the above-mentioned forward feed time Tf read at step S1 from the time when the inlet sensor 7*c*5 is turned off (steps S5 and S6 in FIG. 6). As a result, the foremost product G got into the timing belt 7*e* of the product bucket 7 is further transferred toward the front and moved into substantially the center of the timing belt 7*e* of the product bucket 7, then stopped as shown in FIG. 10.

Then, it is decided based on the position adjustment data Da read at step S1 whether, after the foremost product G in the product column 4 is transferred into the product bucket 7, the position of the front edge of the next foremost product G in the product column 4 needs to be adjusted forward or backward (step s7 in FIG. 6).

Figure 10:
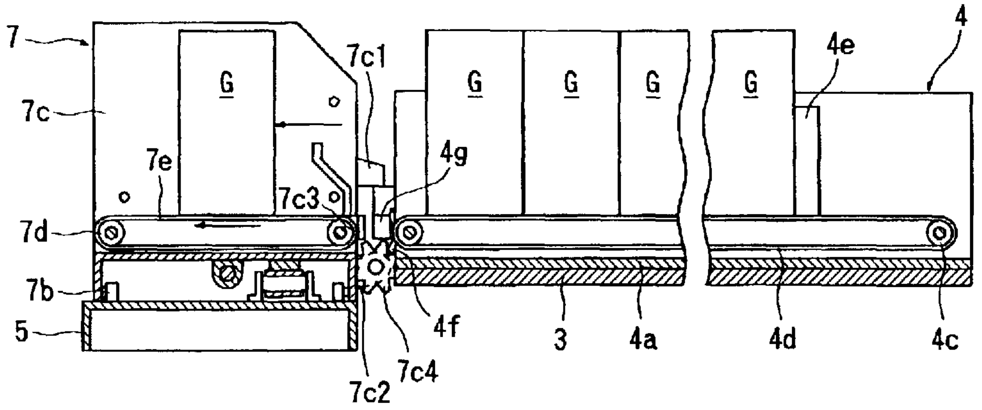
FIG. 10 is a diagram for explaining the product vending operation.

In the case where the products G are of a standard size as shown in FIG. 10, that is, in the case where, after the previous foremost product G in the product column 4 is transferred into the product bucket 7, the position of the front edge of the next foremost product G in the product column 4 is slightly behind the front edge of the timing belt 4*d* of the product column 4, it is decided at step S6 that there is no need to adjust the position of the front edge of the next foremost product G forward or backward. Therefore, the operation for carrying the product out of the product column 4 into the product bucket 7 ends.

Figure 13:
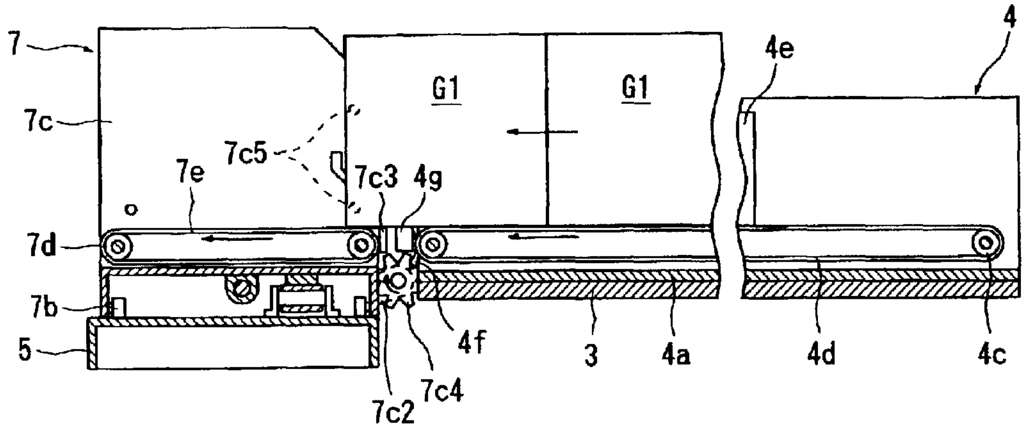
FIG. 13 is a diagram for explaining a position adjustment operation in a case where a product is larger than a standard size.
Figure 14:
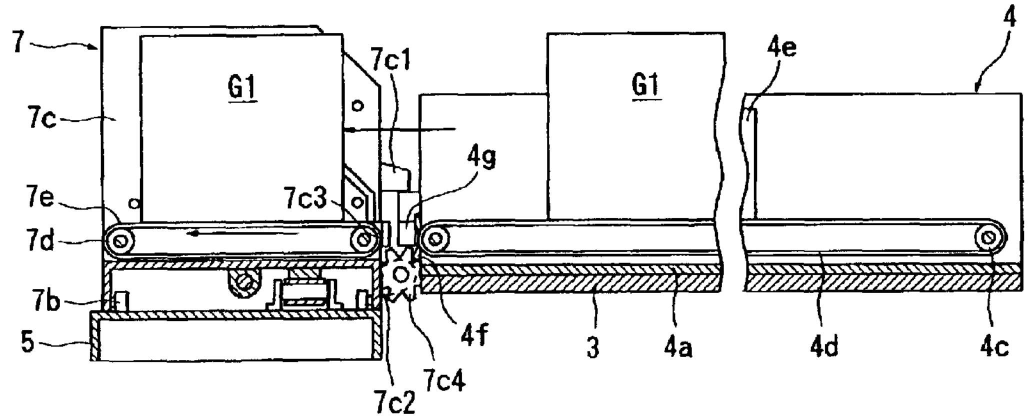
FIG. 14 is a diagram for explaining the position adjustment operation in a case where the product is larger than the standard size.

On the other hand, in the case where products G1 are larger than standard-size products as shown in FIGS. 13 and 14, that is, in the case where, after the previous foremost product G in the product column 4 transferred into the product bucket 7, the position of the front edge of the next foremost product G1 in the product column 4 is behind the position of the front edge of the standard-size product G, then it is decided at step S7 that position adjustment is required.

Figure 15:
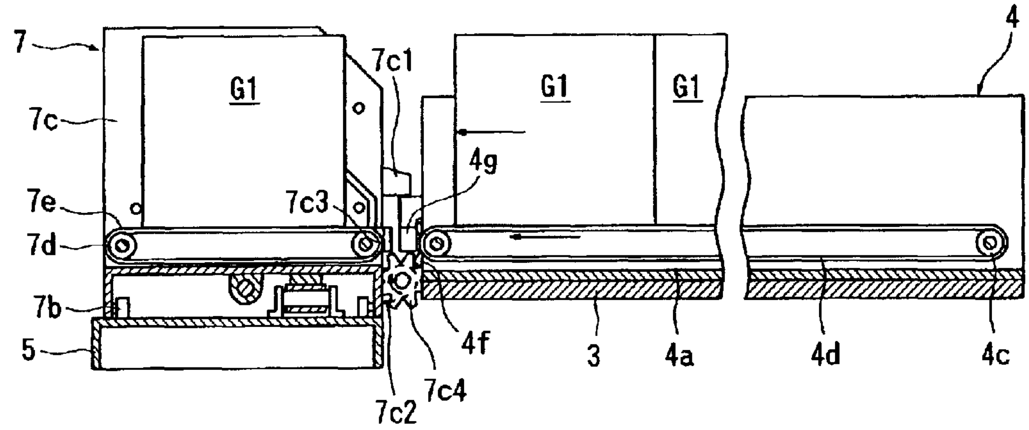
FIG. 15 is a diagram for explaining the position adjustment operation in the case where the product is larger than the standard size.

In this case, based on the position adjustment data Da read at step S1, an adjustment operation for forward moving the front edge position of the foremost product G1 in the product column 4 is performed. In particular, based on the moving direction and time of the timing belt 4*d* of the product column 4 contained in the position adjustment data Da which is set for the product G1, the second motor M2 in one of the driving unit 7*c* of the product bucket 7 is operated to rotate one of the timing belt 4*d* counterclockwise in the drawing in FIG. 14 for predetermined time to move the product G1 toward the front (step S8 in FIG. 6). As a result, all the products G1 on the timing belt 4*d* of the product column 4 are moved forward so that the position of the front edge of the foremost product G1 substantially aligns with the position of the front edge of the standard-size product G, as shown in FIG. 15. This completes the operation for carrying the product out of the product column 4 into the bucket 7.

Figure 16:
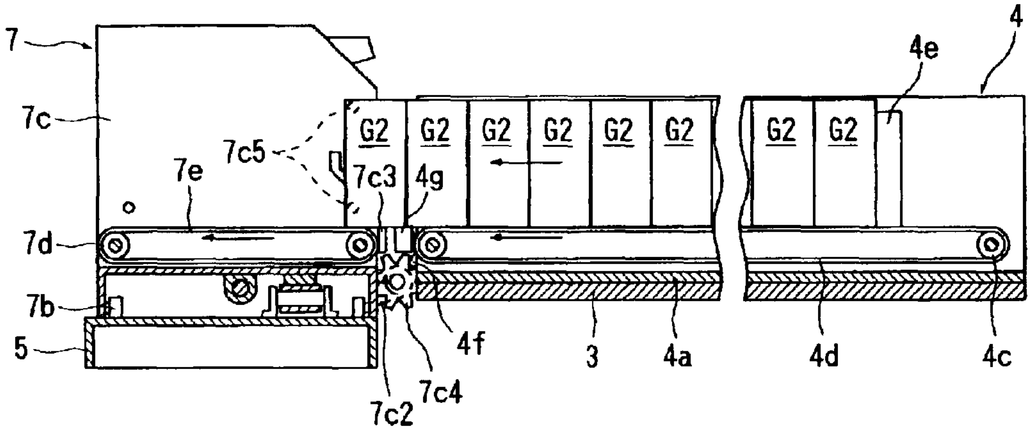
FIG. 16 is a diagram for explaining a position adjustment operation in a case where a product is smaller than the standard size.
Figure 17:
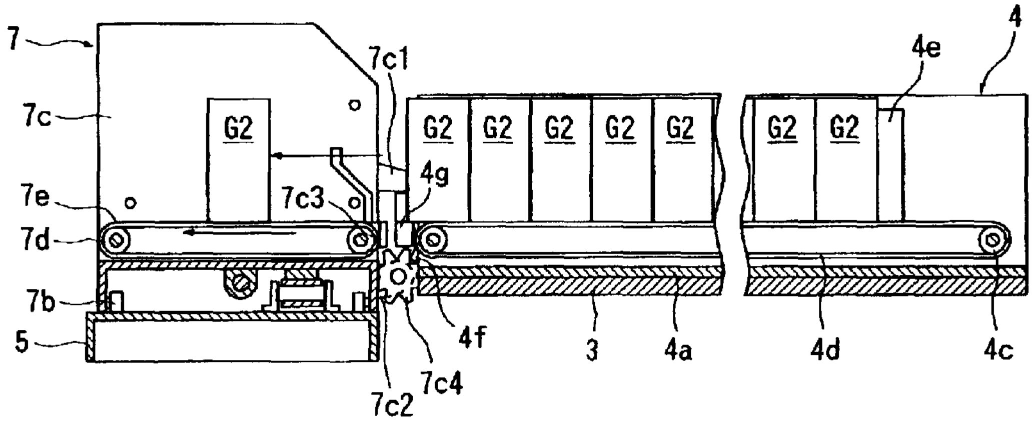
FIG. 17 is a diagram for explaining the position adjustment operation in the case where the product is smaller than the standard size.

On the other hand, in the case where products G2 are smaller than standard-size products as shown in FIGS. 16 and 17, that is, in the case where, after the previous foremost product G2 in the product column 4 is transferred into the product bucket 7, the position of the front edge of the next foremost product G2 in the product column 4 is ahead of the position of the front edge of the standard-size product G, then it is decided that position adjustment is required at step S7.

Figure 18:
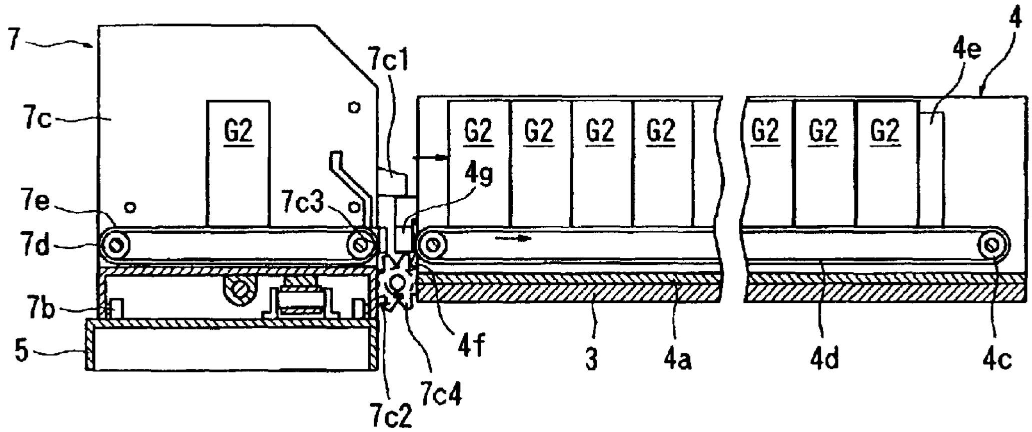
FIG. 18 is a diagram for explaining the position adjustment operation in the case where the a product is smaller than the standard size.

In this case, based on the position adjustment data Da read at step S1, an adjustment operation for backward moving the front edge position of the foremost product G2 in the product column 4 is performed. In particular, based on the moving direction and time of the timing belt 4*d* of the product column 4 contained in the position adjustment data Da which is set for the product G2, the second motor M2 in one of the driving unit 7*c* of the product bucket 7 is operated to rotate one of the timing belt 4*d* clockwise in the drawing in FIG. 17 for predetermined time to move the product G2 toward the rear (step S8 in FIG. 6). As a result, all the products G2 on the timing belt 4*d* of the product column 4 are moved backward so that the position of the front edge of the next foremost product G2 substantially aligns with the position of the front edge of the standard-size product G, as shown in FIG. 18. This completes the operation for carrying the product out of the product column 4 into the bucket 7.

Figure 11:
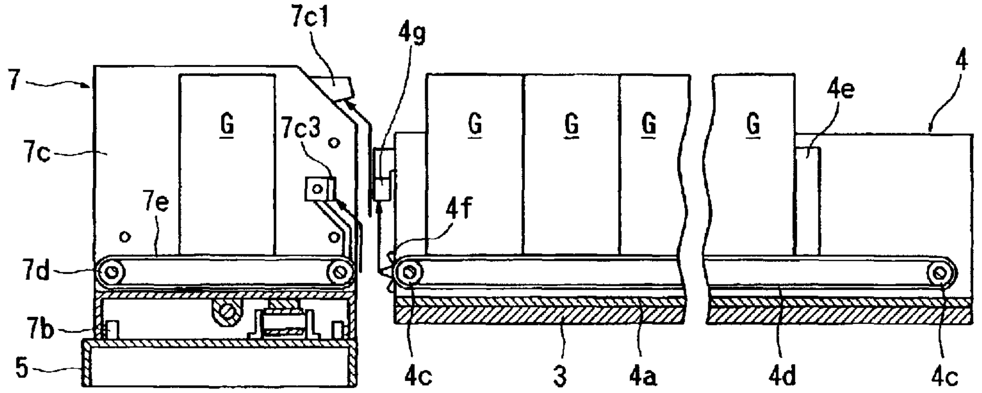
FIG. 11 is a diagram for explaining the product vending operation.

After the product is carried out of the product column 4 to the product bucket 7, the first motor Ml in one of the driving unit 7*c* of the product bucket 7 is caused to run in the direction opposite to the above-described direction to return the press-down lever 7*c*1, connecting arm 7*c*2, and product guard 7*c*3 from the production carrying-out position to the stand-by position so that the product guard 4*g* of the product column 4 returns to the stand-by position by a biasing force applied by the coil spring, as shown in FIG. 11.

Figure 12:
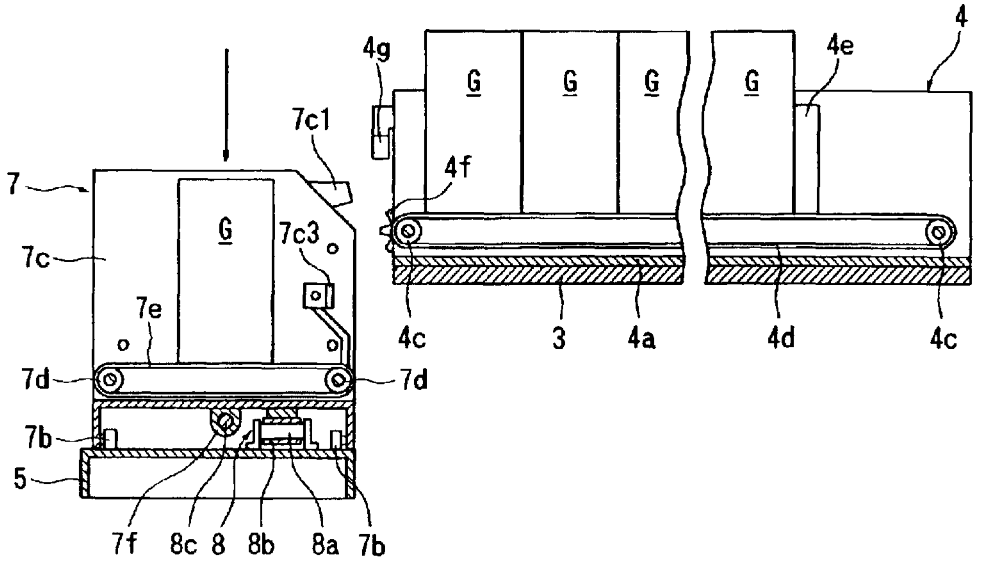
FIG. 12 is a diagram for explaining the product vending operation.

Then, as shown in FIG. 12, the motor 6*e* of the elevator driving apparatus 6 is activated to return the elevator 5 to its stand-by position and, at the same time, the motor 8*d* of the bucket driving apparatus 8 to return the product bucket 7 to its stand-by position.

The third motor of the product bucket 7 is activated to carry the product G (or G1 or G2) on the timing belt 7*e* to the product vending outlet 20. The arrival of the product G (or G1 or G2) at the product outlet 20 is detected by the outlet sensor 7*c*6. Thus, based on whether a detection signal is present or not, it is decided whether the product carrying-out operation is completed. Then, the sequence of product vending operations will end.

Thus, in the vending machine described above, even if the front edges of the products G1 and G2 on the timing belts 4*d* does not come to the given position due to variations in size of the products while the products are being carried out of the product columns 4 into the product bucket 7, the positions of the front edges of products G1 and G2 can be adjusted to the given position by moving the timing belt 4*d* forward or backward after the products G1 and G2 were carried out of the product columns 4 into the product buckets 7.

Therefore, even if the products G, G1, and G2 of different sizes are contained in the product columns 4, forward or backward variations in positions of the front edges of the next foremost products G, G1, and G2 on the timing belts 4*d* of the product columns 4 can be prevented. In addition, since the front edges of the next foremost products G, G1, and G2 in the product columns 4 can be aligned with the given position regardless of their size, the appearance of the products G, G1 and G2 contained in the product columns 4 for a purchaser to directly see them through the transparent front panel 12 for choosing one to buy can be enhanced to inspire the purchasers' appetite for buying the products.

Furthermore, in the vending machine described above, position adjustment data set for each of the products is predetermined based on the size of each product G, G1, and G2 contained in each product column 4 and stored in the memory of the controller 21, the above-described position adjustment is performed by the reading position adjustment data that is set for each of the products contained.

Figure 19:
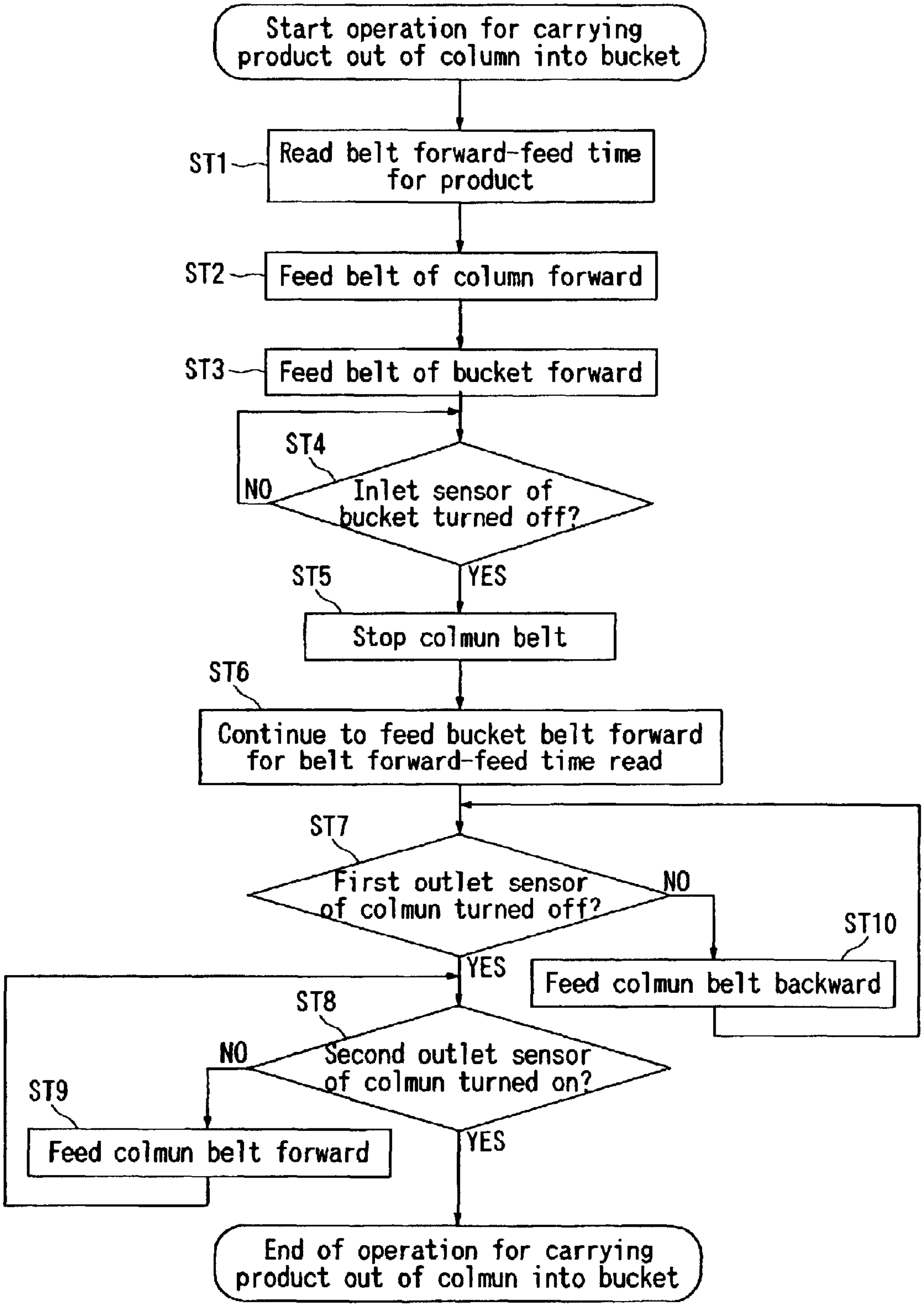
FIG. 19 is a variation of a program flow chart shown in FIG. 6.

FIG. 19 shows a variation of a program flow chart shown in FIG. 6. The program flow chart in FIG. 19 differs from the one shown in FIG. 6 in that only forward-feed time Tf of the timing belt 7*e* of the product bucket 7 that is set for the selected product G is stored in the memory of the controller 21, and position adjustment data set for the product G is obtained from on/off signals of two outlet sensors 4*h* and 4*i* provided in the product column 4.

Figure 20:
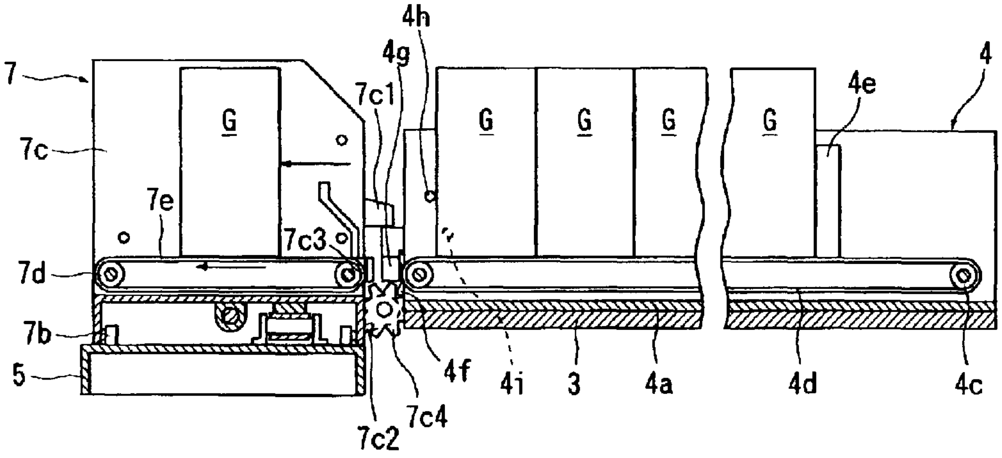
FIG. 20 is a diagram for explaining a position adjustment operation for the standard size product.
Figure 21:
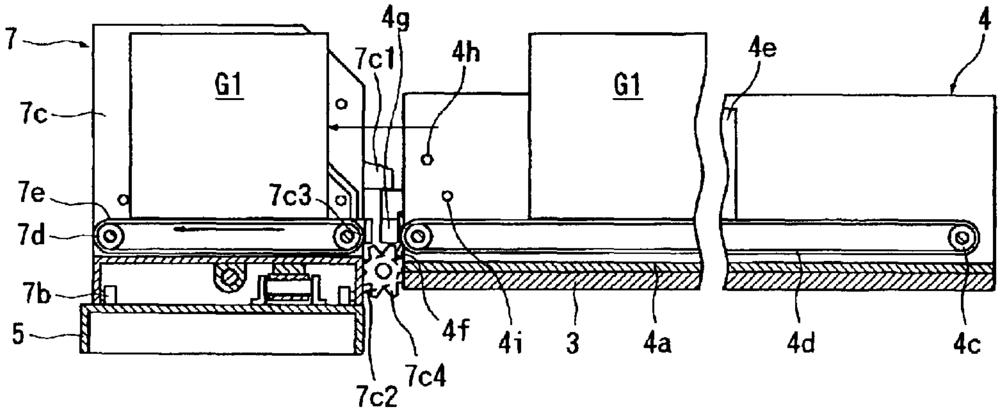
FIG. 21 is a diagram for explaining a position adjustment operation performed when a product is larger than the standard size.
Figure 22:
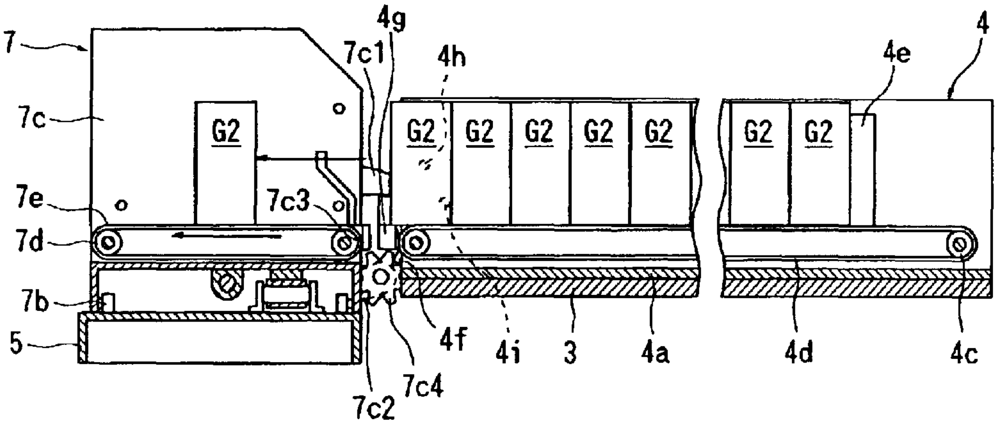
FIG. 22 is a diagram for explaining a position adjustment operation performed when a product is smaller than the standard size.

FIG. 20 shows a case where standard-size products G contained in the product column 4. FIG. 21 shows a case where products G1 contained in the product column 4 which are larger than the standard-size products. FIG. 22 shows a case where products contained in the product column 4 which are smaller than the standard-size products. The first outlet sensor 4*h* is provided on inner surface of the front of the column body 4*a* of each product column 4 for detecting the position of the product G (or G1 or G2). The second outlet sensor 4*i* is provided in a position below and behind the first outlet sensor 4*f* for detecting the position of the product G (or G1 or G2). The first and second outlet sensors 4*f* may be formed by a reflex photoelectric switch, microswitch or other devices.

As described above, after the elevator 5 and the product bucket 7 reach the target position and become ready for carrying out the product, the product is carried out from the given product column 4 into the product bucket 7 according to the program flow chart shown in FIG. 19.

First, forward feed time Tf of the timing belt 7*e* of the product bucket 7, which corresponds to the selected product G, is read from the memory of the controller 21 (step ST1 in FIG. 19). The forward feed time Tf is predetermined based on the size of products G contained in each product column 4 and stored in the memory of the controller 21.

Next, the second motor M2 in one of the driving units 7*c* of the product bucket 7 is activated to rotate the driving gear 7*c*4. The rotatory force is transmitted to the driven gear 4*f* of the product column 4 to rotate one of the timing belts 4*d* counterclockwise in FIG. 20 and carry the products G toward the front (step ST2 in FIG. 19). At the same time, the third motor M3 in the product bucket 7 is activated to rotate both of the timing belts 7*e* counterclockwise in FIG. 20 to carry the products G toward the front (step ST3 in FIG. 19). As a result, the foremost product G on the timing belt 4*d* of the product column 4 is carried toward the front and gets into the timing belts 7*e* of the product bucket 7.

Then, it is decided whether the inlet sensor 7*c*5 of the product bucket 7 is turned off by the foremost product G by the foremost product G on the timing belt 4*d* of the product column 4 reaches and rests on the timing belts 7*e* of the product bucket 7, (step ST4 in FIG. 19).

If the inlet sensor 7*c*5 of the product bucket 7 is turned off at step ST4, the timing belt 4*d* of the product column 4 is stopped, while the product G continues to be carried toward the front by the timing belts 7*e* of the product bucket 7 rotated counterclockwise in FIG. 20 for the above-mentioned forward feed time Tf read at step ST1 from the time when the inlet sensor 7*c*5 is turned off (steps ST5 and ST6 in FIG. 19). As a result, the foremost product G got into the timing belts 7*e* of the product bucket 7 is further transferred toward the front and moved into the center of the timing belts 7*e* of the product bucket 7, then stopped.

Then, after the foremost product G in the product column 4 is transferred-into the product bucket 7, the position of the front edge of the next foremost product G on the timing belt 4*d* of the product column 4 is detected based on on/off signals of the first and second outlet sensor 4*h* and 4*i* in the product column 4 (steps ST7 and ST8 in FIG. 19).

In the case where the products G are of the standard-size product as shown in FIG. 20, that is, in the case where, after the previous foremost product G carried into the product bucket 7, the position of the front edge of the next foremost product G in the product column 4 is in between the first outlet sensor 4*h* and the second outlet sensor 4*i*, the first outlet sensor 4*h* is turned off and the second outlet sensor 4*i* is turned on. In this case, the position of the front edge of the next foremost product G in the product column 4 is not required to be adjusted forward or backward. Therefore, the process for carrying out the product G from the product column 4 into the product bucket 7 ends.

On the other hand, in the case where the products G1 is larger than the standard-size products as shown in FIG. 21, that is, in the case where, after the previous foremost product G1 in the product column 4 is carried into the product bucket 7, the position of the front edge of the next foremost product G1 in the product column 4 is behind the first outlet sensor 4*h* and the second outlet sensor 4*i*, both of the first and second outlet sensors 4*h* and 4*i* are turned off.

In this case, the process proceeds from step ST8 to step ST9, where the timing belt 4*d* of the product column 4 is fed forward to carry together the products G1 on the timing belt 4*d* in the product column 4 forward until the second outlet sensor 4*i* is turned on, so that the position of the front edge of the next foremost product G1 is substantially aligned with the position of the front edge of standard-size products G. Then, the process for carrying out the product G1 from the product column 4 into the product bucket 7 ends.

On the other hand, in the case where the products G2 are smaller than the standard-size products as shown in FIG. 22, that is, in the case where, after the previous foremost product G2 in the product column 4 is carried into the product bucket 7, the position of the front edge of the next foremost product G2 in the product column 4 is ahead of the first and second outlet sensors 4*h* and 4*i*, then both of the first and second outlet sensors 4*h* and 4*i* are turned on.

In this case, the process proceeds from step ST7 to step ST10, where the timing belt 4*d* of the product column 4 is fed backward to carry together the products G2 on the timing belt 4*d* of the product column 4 backward until the first outlet sensor 4*h* is turned off, so that the position of the front edge of the next foremost product G2 is substantially aligned with the position of the front edge of standard-size products G. Then, the process for carrying out the product G1 from the product column 4 into the product bucket 7 ends.

By using the position adjustment method described with respect to FIGS. 19 through 22 instead of the position adjustment method for the vending machine shown in FIGS. 1 through 18, even if the products G, G1, and G2 of different sizes are contained in the product columns 4, forward or backward variations in positions of the front edges of the next foremost products G, G1, and G2 on the timing belt 4*d* of the product column 4 can be prevented. In addition, since the front edges of the next foremost products G, G1, and G2 in the product columns 4 can be aligned with the given position regardless of their size, the appearance of the products G, G1 and G2 contained in the product columns 4 for a purchaser to directly see them through the transparent front panel 12 for choosing one to buy can be enhanced to inspire the purchasers' appetite for buying the products.

Furthermore, position adjustment data corresponding to products G is obtained from on/off signals of the two outlet sensors 4*h* and 4*i* provided in the product column 4. Therefore, it is not necessary to store position adjustment data based on the size of products G, G1, and G2 contained in the product columns 4 in the memory of the controller 21.

While the vending machine has been illustrated in which three product columns 4 are provided side by side on each of the seven shelves 3, the number of shelves 3 may be more than seven or less than seven and the number of product columns 4 may be more than three or less than three.

The pulse signal output from the rotary encoder of the bucket driving apparatus 8 is used as the reference signal for generating shelf position data and a pulse signal output from the rotary encoder of the elevator driving apparatus 6 is used for the reference signal for generating column position data in the examples. However, if pulse motors are used as the motors of the bucket driving apparatus 8 and elevator driving apparatus 6, pulse signals output from the pulse motors may be used as reference signals for the generating shelf position data and column position data.

The preferred embodiments described herein are illustrative and not limitative. The scope of the present invention is defined by the claims and all variations covered by the claims are considered to be within the scope of the present invention.

What is claimed is:

1. A vending machine comprising:

a plurality of product columns each having a conveyer belt capable of moving forward and backward;

a belt driving apparatus for moving the conveyer belt forward and backward;

an elevator provided in front of the product columns and being capable of moving up and down;

an elevator driving apparatus for moving the elevator up and down;

a product bucket provided in the elevator and being capable of moving sideways;

a bucket driving apparatus for moving the product bucket sideways;

product carrying-out means for moving the elevator and the product bucket so the product bucket faces a given product column containing products and moving forward the conveyer belt of the given product column to carry a foremost product of the products placed in line on the conveyer belt into the product bucket; and product position adjustment means for moving the conveyer belt of the given product column forward or backward to adjust a position of the front edge of a next foremost product on the conveyer belt to a given position after the foremost product in the given product column is carried into the product bucket.

2. The vending machine according to claim 1, wherein the product position adjustment means comprises necessity-of-adjustment deciding means for deciding whether a position adjustment is required after the foremost product in the given product column is carried into the product bucket.

3. The vending machine according to claim 2, wherein the necessity-of-adjustment deciding means decides whether the position adjustment is required based on a position adjustment data predetermined for the products contained in each of the product columns.

4. The vending machine according to claim 3, wherein:

the necessity-of-adjustment deciding means decides whether the position of the front edge of the next foremost product on the conveyer belt is forward or backward of the given position based on the position adjustment data; and the product position adjustment means moves the conveyer belt of the given product column to achieve the position adjustment only when the position of the front edge of the next foremost product is forward or backward of the given position based on a decision of the necessity-of-adjustment deciding means.

5. The vending machine according to claim 4, wherein the position adjustment data includes a moving direction and a moving time of the conveyer belt that are predetermined based on the size of the products contained in each of the product columns.

6. The vending machine according to claim 2, wherein the necessity-of-adjustment deciding means decides whether the position adjustment is required based on a detection signal of a position detection sensor provided in each of the product columns.

7. The vending machine according to claim 6, wherein:

the necessity-of-adjustment deciding means decides whether the position of the front edge of the next foremost product on the conveyer belt is forward or backward of the given position based on the detection signal of the position detection sensor; and the product position adjustment means moves the conveyer belt of the given product column to achieve the position adjustment only when the position of the front edge of the next foremost product is forward or backward of the given position based on a decision of the necessity-of-adjustment deciding means.

8. A method of controlling operation of a vending machine; the vending machine comprising a plurality of product columns each having a conveyer belt capable of moving forward and backward, a belt driving apparatus for moving the conveyer belt forward and backward, an elevator provided in front of the product columns and being capable of moving up and down, an elevator driving apparatus for moving the elevator up and down, a product bucket provided in the elevator and being capable of moving sideways, and a bucket driving apparatus for moving the product bucket sideways; said method comprising the steps of:

moving the elevator and the product bucket so the product bucket faces a given product column containing products;

moving forward the conveyer belt of the given product column to carry a foremost product of the products placed in line on the conveyer belt into the product bucket; and moving the conveyer belt of the given product column forward or backward to adjust a position of the front edge of a next foremost product on the conveyer belt to a given position.

9. The operation control method according to claim 8, further comprising the steps of:

deciding whether a position adjustment is required after the foremost product in the given product column is carried into the product bucket; and moving the conveyer belt of the given product column forward or backward to adjust the position of the front edge of the next foremost product on the conveyer belt to the given position when the position adjustment is required.

10. The operation control method according to claim 9, wherein a decision whether the position adjustment is required is made based on a position adjustment data predetermined for products contained in each of the product columns.

11. The operation control method according to claim 10, wherein the position adjustment data includes a moving direction and a moving time of the conveyer belt that are predetermined based on the size of the products contained in each of the product columns.

12. The operation control method according to claim 9, wherein a decision whether the position adjustment is required is made based on a detection signal of a position detection sensor provided in each of the product columns.

* * * * *